Figure 3:
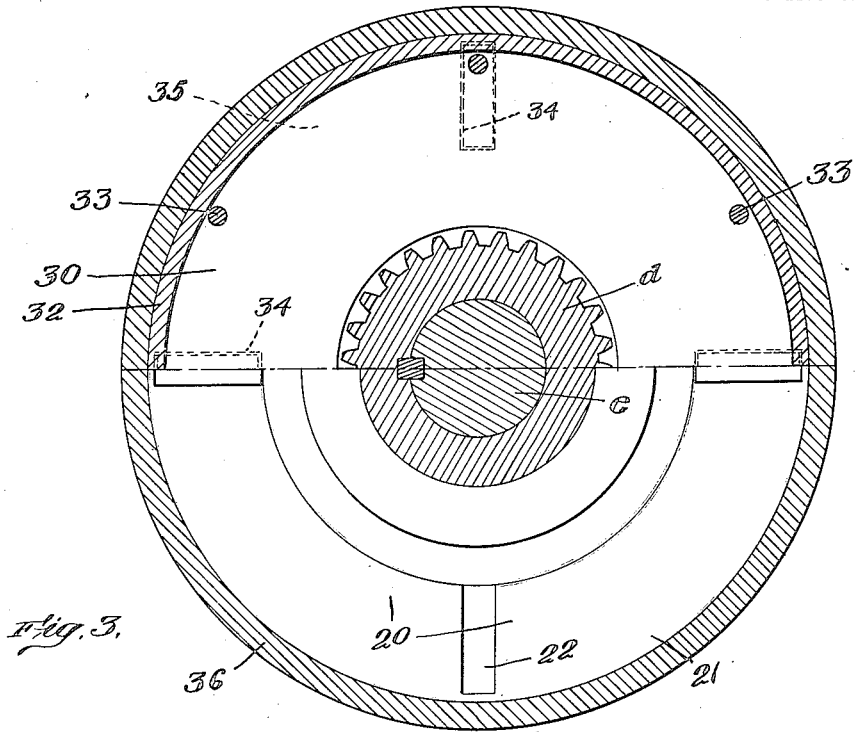

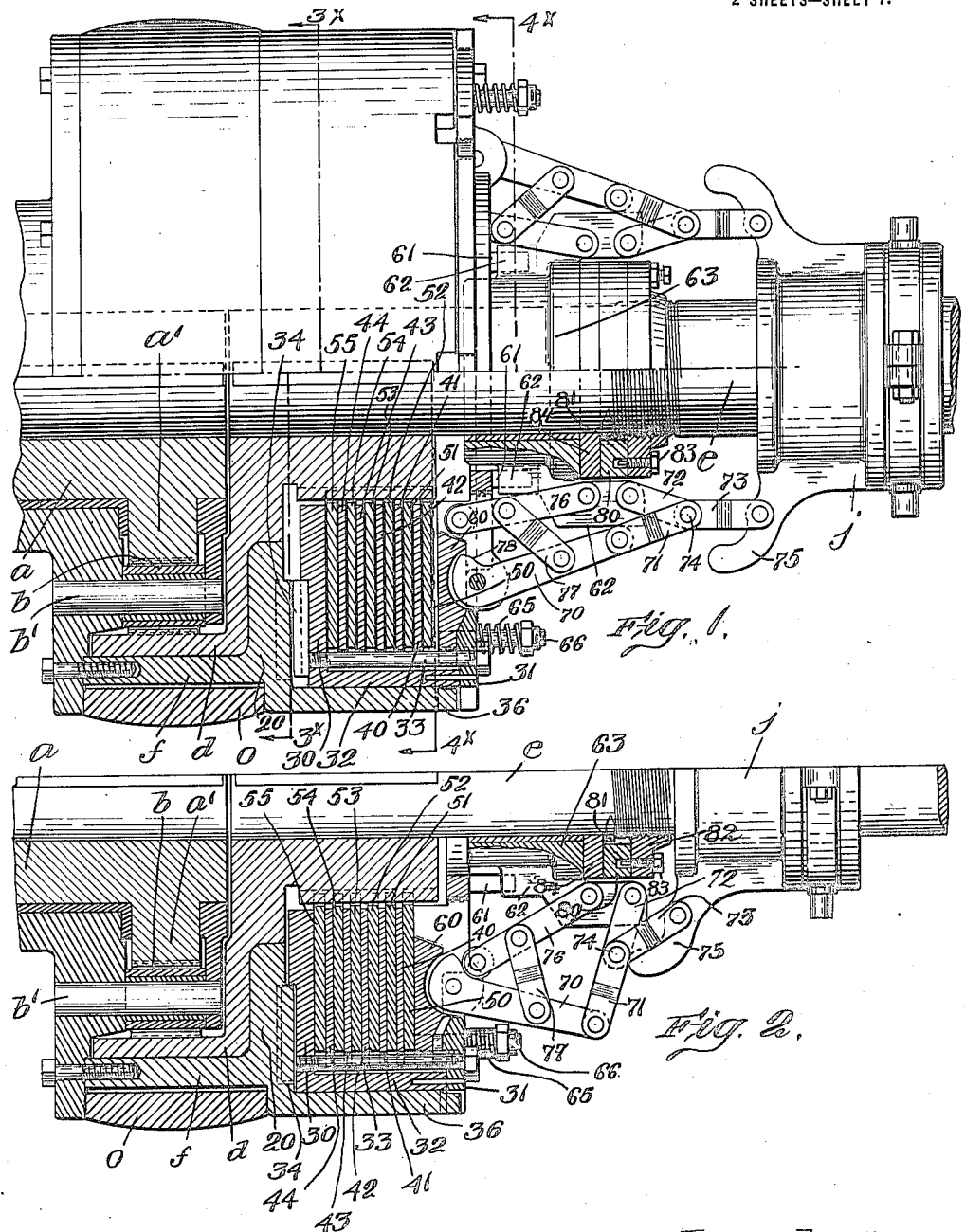

H. A. TUTTLE.
CLUTCH FOR REVERSING GEARING.
APPLICATION FILED AUG. 2, 1912.

1,140,346.

Patented May 18, 1915.
2 SHEETS—SHEET 2.

Witnesses
H. B. Davis.
H. McDonald

Inventor:
Henry A. Tuttle
by Nelyn & Harriman
attys.

UNITED STATES PATENT OFFICE.

HENRY A. TUTTLE, OF TAUNTON, MASSACHUSETTS.

CLUTCH FOR REVERSING-GEARING.

1,140,346.         Specification of Letters Patent.         Patented May 18, 1915.

Application filed August 2, 1912. Serial No. 712,890.

*To all whom it may concern:*

Be it known that I, HENRY A. TUTTLE, a citizen of the United States, residing at Taunton, in the county of Bristol and State of Massachusetts, have invented an Improvement in Clutches for Reversing-Gearing, of which the following is a specification.

This invention relates to clutches especially adapted for use in connection with reversing-gearing, such for instance as shown in Letters Patent #901,664, dated October 20, 1908, wherein a clutch is employed for indirectly connecting a shaft to be driven with a driving-shaft. The clutch shown in said patent comprises friction-disks or plates which are movable axially in one direction by pressure upon them for connecting the two shafts, and in the other direction when pressure upon them is relieved to disconnect said shafts, but as the extent of axial movement is slight, it frequently happens that when the clutch is operated to disconnect the shafts the friction-disks still have a tendency to cling together or to engage each other sufficiently to drag one upon another, thereby causing or having a tendency to cause the driven-shaft to be rotated by the driving-shaft, and if the driving-shaft is rotating rapidly at such time the friction-disks are liable to become heated, both of which results are objectionable.

The clutch-mechanism comprehends a toothed clutch-member adapted for connection with one of the shafts, a coöperating toothed clutch-member which is made as a carrier for a set of friction-disks, some of which disks are slidably connected with the carrier and others with the other shaft, a member, such as a plate, arranged in front of said set of disks which is movably connected with the carrier, and means to move said plate, disks and carrier as a unit to cause the toothed clutch-member of the carrier to engage its fellow clutch-member and to move said plate independently of the carrier to apply pressure to the friction-disks, thereby to connect the two shafts or other members together, said moving-means operating upon return movement to move said plate independently of the carrier to relieve pressure upon the friction-disks, and to move said plate, disks and carrier as a unit to disconnect the two shafts or members.

My invention also involves lever-mechanism for operating the clutch-mechanism progressively adapted to be operated by a sliding actuator, said lever-mechanism being movable from normal to abnormal position to move the actuating-member of the clutch-mechanism and subsequently movable as a unit to further move said actuating-member, thereby to progressively actuate the clutch-mechanism to connect the two shafts or members, and movable from abnormal to normal position to return said clutch actuating-member and then movable as a unit to further return said clutch actuating-member, thereby to progressively restore the clutch-mechanism to disconnect the two shafts or members.

Figure 4:
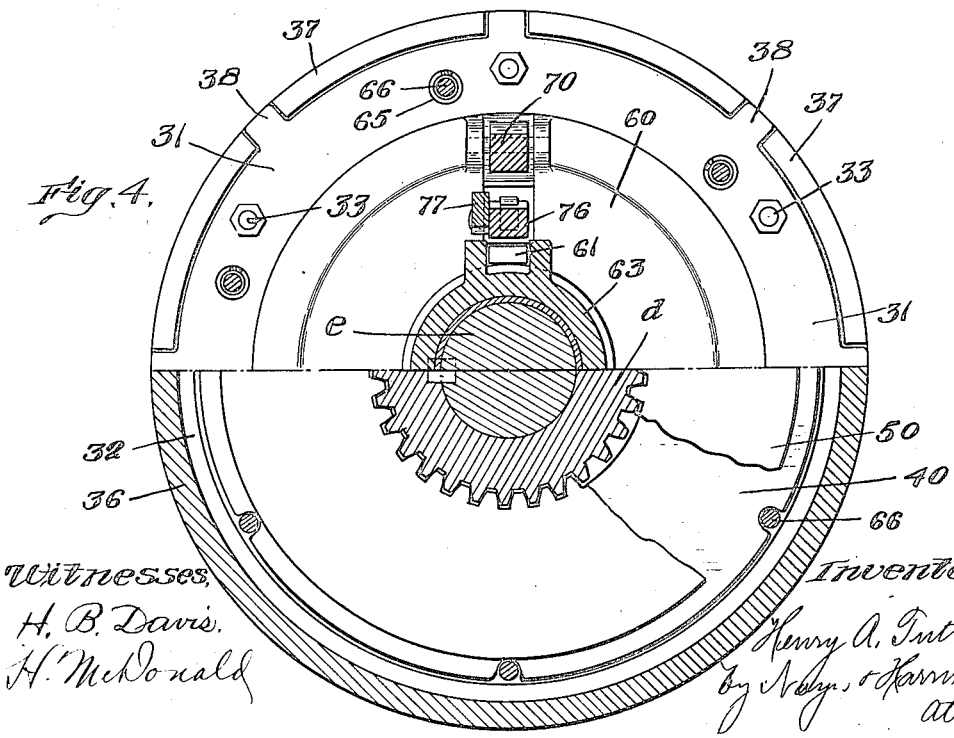

Figure 1 is a partial side elevation and partial longitudinal vertical section of a clutch embodying this invention in connection with a reversing-gearing, the clutch parts being in neutral or disengaged position. Fig. 2 is a similar longitudinal vertical section, the clutch parts being in engaging position. Fig. 3 is a transverse vertical section taken on the dotted line $3^x$—$3^x$, Fig. 1. Fig. 4 is a transverse vertical section taken on the dotted line $4^x$—$4^x$, Fig. 1.

The reversing-gearing here shown for the sake of illustrating my present invention consists of a driving-shaft $a$, spur-gear $a'$ thereon, pinions $b$ engaging said spur-gear, studs $b'$ bearing said pinions, a pinion-carrier $f$ bearing said studs, an internal-gear $d$ engaging said pinions $b$, a driven-shaft $e$ to which said internal-gear is secured, and a brake-band or arresting-clamp $o$, adapted for engagement with the pinion-carrier, all constructed and arranged and adapted for operation substantially as shown in the patent aforesaid. It will be understood, however, that my invention is adapted to other forms of gearing.

The toothed-clutch comprises two coöperating clutch-members having teeth on their adjacent faces with spaces therebetween. As here shown, the pinion-carrier $f$ has an end wall 20, which overlies the crown of the internal gear $d$, and said end wall serves as one of the members of the toothed clutch, its outer face being formed with teeth 21, with spaces 22 between said teeth. In front of said end wall 20, a disk-carrier is provided bearing a set of annular friction-disks, and said disk-carrier comprises a rear end wall 30, a front end wall 31, and a cylindrical side wall 32, all rigidly connected together, and, as here shown, the cylindrical side wall is formed integral with the rear end wall, and the front end wall is secured at the front end of said side wall by screws 33 passing through said wall and into the rear end wall, the shanks of said screws being arranged at the inside of the cylindrical side wall for the purposes to be described. The outer face of the rear end wall 30 of said disk-carrier, as here shown, is formed with teeth 34 with spaces 35 between said teeth. The teeth 34 on the wall 30 are designed to enter the interdental spaces 22 in the wall 20 and the teeth 21 on said wall 20 are designed to enter the interdental spaces 35 in the wall 30, when the two toothed clutch-members are in engagement.

The disk-carrier is inclosed by a cylindrical wall or case 36 formed on the pinion-carrier, and the front end or edge of said wall is formed with teeth 37, with spaces between them. The front end wall 31 of the disk-carrier has its outer edge extended over the edge of the wall 36, and said outer edge is formed with teeth 38 with spaces therebetween, said teeth 38 being adapted to enter the interdental spaces in the front end of the side wall 36 and the teeth 37 in said side wall being adapted to enter the interdental spaces in the edge of the end wall 31. Thus, as here shown, the disk-carrier has two toothed engaging-portions for engagement with two toothed engaging-portions on the pinion-carrier, but so far as my invention is concerned, the engaging-portions at one end of the disk-carrier may be omitted. Engaging-portions are provided at both ends of the disk-carrier for engagement with the pinion-carrier for the purpose of insuring a more substantial engagement than if engaging-portions at one end only are employed.

The pinion-carrier is here shown as held against axial movement, hence its walls 20 and 36, having engaging-portions, are not movable axially, but the disk-carrier is movable axially, so that its walls 30 and 31, are movable toward and from the walls 20 and 36 respectively. When the disk-carrier is moved axially in a direction toward the left from the position shown in Fig. 1, the members of the toothed clutch will be engaged, as shown in Fig. 2, and when moved in the other direction said members will be disengaged, as shown in Fig. 1. In lieu of employing a pinion-carrier and a disk-carrier and forming them to serve as coöperating parts of the toothed clutch, other members of the gearing between the two shafts to be connected together may be employed.

The disk-carrier has between its end walls 30 and 31 a plurality of annular friction-disks, arranged side by side, alternate disks of the set, as 40, 41, 42, 43, 44 being slidably connected with the carrier, thus adapting them for rotary movement with the carrier and axial movement with respect thereto, and the others, as 50, 51, 52, 53, 54, 55, being slidably connected with the hub of the internal gear $d$, thus adapting them for rotary movement with said gear and axial movement with respect thereto.

The friction-disks 40, 41, etc., have recesses formed in their outer edges which receive the shanks of the screws 33 for slidably connecting them with the disk-carrier, and the disks 50, 51, etc., have teeth formed on their inner edges which enter longitudinal grooves formed in the hub of the internal gear for slidably connecting them with said gear. A plate 60 which serves as the actuating member is arranged in the disk-carrier, in front of the set of friction-disks, and said plate has recesses in its outer edge which receives the shanks of the screws 33 to slidably connect it with the carrier, adapting it for rotary movement with the carrier and for axial movement with respect thereto. Said plate 60 has upon its outer face near its inner edge lugs 61, which enter recesses formed in projections 62 on a freely rotatable collar 63, arranged on the shaft $e$, thereby connecting the plate 60 and the sleeve 63 so they may rotate together, but permitting axial movement of the plate. Mounted upon the shaft $e$ is a ring 80 having a key-way formed therein for the reception of the key 81 carried by the shaft. Threaded upon the shaft $e$, and arranged adjacent to the ring 80 is a collar 82, whereby the ring 80 may be adjusted longitudinally upon the shaft, and screws 83 connect the ring and collar together to prevent the latter from rotating. Interposed between one end of the sleeve 63 and the ring 80 is a washer 84. From this construction it is obvious that the sleeve 63 may rotate freely upon the shaft but is prevented from longitudinal movement in one direction by means of the collar 82 and the ring 80, and this sleeve 63 is prevented from longitudinal movement in its opposite direction by means of a lever-mechanism and thrust-bar which will later be described. Said plate occupies a position between the front friction-disk 50 of the set and the front end wall 31 of the disk-carrier, and is normally held in engagement with the inner face of said front end wall by means of springs 65 encircling pins 66 arranged on the outer face of said plate and projecting through holes in said front end wall, said springs bearing at one end against the outer face of said front end wall and their other ends against nuts on the pins.

The force of the springs exerted upon the nuts in an outward direction tends to draw the plate 60 toward and into engagement with the front end wall, as represented in Fig. 1. Said plate 60 is movable axially in one direction to move the disk-carrier and friction-disks carried by it, as a unit, in the direction of their axes, thereby to cause the toothed end walls 30 and 31 to engage the toothed walls 20 and 36, and subsequently is moved independently of the carrier to apply pressure to the set of friction disks and cause them to engage each other and the end wall 30 of the disk-carrier; and is moved in the opposite direction to relieve the pressure upon the friction-disks and subsequently move the disk-carrier for disengagement of the toothed clutch-members. It will be observed that the disk-carrier is constructed and arranged to serve as a toothed clutch-member and has a friction clutch-member thereby involving both functions and may well be termed a double clutch-member. To thus move axially or slide the actuating-member or plate 60, as here shown, two or more lever-mechanisms are employed which connect it with a sliding thrust-collar $j$, which serves as and constitutes the operating-member therefor, said collar being mounted on the shaft $e$ and adapted for axial movement thereon by a suitable actuating-lever, not shown. Each lever-mechanism here shown comprises a lever 70 pivotally connected at one end to the plate 60, and at the other end to one lever 71 of a toggle, the other lever 72 of said toggle being pivotally connected to the projection 62 on the collar 63; and a lever 73 connected at one end with the pivot-pin 74 of the toggle and at the other end with an ear 75 on the thrust-collar $j$; and a thrust-bar 76 pivotally connected at one end to said projection 62, and connected intermediate its length by a link 77 with the lever 70, whereby it is moved on its pivot by said lever 70. The free end of said thrust-bar is arranged for engagement with a projection 78 on the lever 70 when said lever 70 is moved into the position shown in Fig. 2, but normally said end of the thrust-bar occupies an elevated position, as shown in Fig. 1.

As the thrust-collar $j$ is moved in a direction toward the left from the position shown in Fig. 1 to the position shown in Fig. 2 the lever 73 first acts to straighten the toggles 71, 72, thereby to move the lever 70 on its pivot and to draw the thrust-bar 76 into position to engage the projection 78 on said lever 70, and the pivotally connected ends of the toggle when thus straightened strike the ear 75, which serves as a stop therefor, and said lever-mechanism when thus set is then moved as a unit. Said lever-mechanism therefore, is set during the initial movement of the thrust-collar and moved as a unit during the final movement thereof. During said initial movement of the thrust-collar and the setting of the lever-mechanism the plate 60 and disk-carrier bearing the friction-disks are moved as a unit to cause the toothed-portions of the double clutch-member 30, 31, to engage their fellow toothed-members 20, 36, and during the final movement thereof and while the lever-mechanism is being moved as a unit the plate 60 is moved away from the front wall 31 of the disk-carrier to cause the friction disks to move axially to engage each other and the rear wall 30 of the double clutch-member, the springs 65 being compressed. The plate 60 and disk-carrier begin to move as a unit at the beginning of the initial movement of the thrust-collar and the plate 60 begins to move away from the front wall 31 at the beginning of the final movement thereof. With the parts thus disposed, (see Fig. 2), the two shafts $a$ and $e$ are connected together through the indirect gearing and the driven-shaft $e$ is rotated by and in the same direction as the driving-shaft $a$. To disconnect said shafts the clutches are disengaged and to effect their disengagement the thrust-collar $j$ is moved axially in a direction toward the right, from the position shown in Fig. 2, and during the first part of its movement, which is its initial movement in this direction, the toggle 71, 72, is bent, the lever 70 raised, and the thrust-bar also raised to a position out of engagement with the projection on the lever 70. The pressure on the plate 60 is thus relieved and the springs 65 permitted to extend and the compression of the disks exerts a force tending to move said plate 60 axially in a direction toward the right until it engages the front end wall 31 of the disk-carrier, thereby releasing the friction-clutch, as the thrust collar is moved farther, the lever-mechanism is returned to normal position, (see Fig. 1) and upon the final movement of the thrust-collar in this direction, the lever-mechanism is moved as a unit, and the plate 60 is moved axially and being in engagement with the front wall of the disk-carrier said disk-carrier and friction-disks borne by it are moved as a unit to disengage the double clutch-member 30, 31 from the toothed clutch member 20, 36. Thus it will be seen that during said initial and final movements of the sliding-collar $j$ the friction-clutch is first operated to disconnect the shaft $e$ from the double clutch member, and then said double clutch-member is moved to disconnect it from the driving-shaft $a$.

In operating the reversing-gearing the driven-shaft $e$ is caused to rotate with the drive-shaft $a$ either in a forward or reverse direction or it may remain idle which is its neutral position. When the thrust-collar $j$ is in the position, shown in Fig. 1, the clutch-mechanism is released, whereby the internal gear and the pinion-carrier are disconnected, and the drive-shaft rotating the spur gear $a'$ will rotate the pinions about their axes, and, as the pinion-carrier is free, it will be rotated in an opposite direction to that of the spur-gear, whereby the driven-shaft $e$ will remain idle or in its neutral position. When the clutch-mechanism is in the position shown in Fig. 1, and the brake-band $o$ is tightened, the pinion-carrier will be held stationary and the pinions will rotate about their axes, causing the internal gear $d$ to rotate in the opposite direction from the direction of rotation of the drive-shaft, thereby giving a reverse direction of rotation to the driven-shaft $e$. When the clutch-mechanism is thrown into engaging-position as shown in Fig. 2, the hub of the internal-gear and the pinion-carrier are connected and substantially form one member, whereby, upon the rotation of the spur-gear, the pinions will connect the internal-gear to the spur-gear, and direct drive of the driven-shaft $e$ is accomplished.

It will be understood that many of the structural features here shown for the sake of illustrating my invention may be changed without departing from its spirit and scope.

The clutch-plates or members here shown, having edge projections of gear-tooth formation are not specifically herein claimed, as they form the subject matter of my application #9,140, filed Feb. 18, 1915.

I claim:—

1. A clutch-mechanism for reversing-gearing and the like consisting of a toothed clutch-member connected with one of the shafts, a coöperating toothed clutch-member made as a carrier, a set of annular friction-disks arranged in said carrier, some slidably connected with the carrier and others slidably connected with the other shaft, a member arranged in front of the set of disks, means to move said member, disks and carrier as a unit to cause the toothed clutch-member of the carrier to engage its fellow clutch-member and to move said member axially, independently of the carrier, to apply pressure to the friction-disks, substantially as described.

2. A clutch-mechanism for reversing-gearing and the like consisting of a toothed clutch-member connected with one of the shafts, a coöperating toothed clutch-member made as a carrier, a set of annular friction-disks arranged in said carrier, some slidably connected with the carrier and others slidably connected with the other shaft, a member arranged in front of the set of disks, means to move said member, disks and carrier as a unit to cause the toothed clutch-member of the carrier to engage its fellow clutch-member and to move said member axially, independently of the carrier, to apply pressure to the friction-disks, said moving-means upon return movement operating to move said member independently of the carrier to relieve the pressure upon the friction-disks and to move said member, disks and carrier as a unit to disconnect the toothed clutch-members, substantially as described.

3. A clutch-mechanism for reversing-gearing and the like consisting of a toothed clutch-member connected with one of the shafts, an axially movable disk-carrier having a toothed end-wall for coöperation with said toothed clutch-member, a set of annular friction-disks arranged in said carrier, some slidably connected with the carrier and others slidably connected with the other shaft, an actuating-member arranged in front of said disks, means to movably connect said member with the carirer and means to move said member axially first to move the carrier and disks borne by it as a unit and then to move the disks independently of the carrier for engaging the clutch-mechanism, substantially as described.

4. A clutch-mechanism for reversing-gearing and the like consisting of a toothed clutch-member connected with one of the shafts, having two sets of teeth, an axially movable disk-carrier having a side-wall and two toothed end-walls for coöperation with said toothed clutch-member, a set of annular friction-disks arranged in said carrier, some slidably connected with the carrier and others slidably connected with the other shaft, a plate arranged in said carrier in front of said disks, means to movably connect said plate with the carrier, and means to move said plate axially first to move the carrier and disks borne by it as a unit and then to move the disks independently of the carrier for engaging the clutch-mechanism, substantially as described.

5. A clutch-mechanism for reversing-gearing and the like consisting of a toothed clutch-member connected with one of the shafts, a coöperating toothed clutch-member made as a carrier, and having an end-wall, a set of annular friction-disks arranged in said carrier, some slidably connected with the carrier and others slidably connected with the other shaft, a plate arranged in said carrier between the set of disks and the end-wall of the carrier, means extended through the end-wall of the carrier to slidably connect said plate therewith, and means to move said plate axially first to move the carrier and disks borne by it as a unit and then to move the disks independently of the carrier for engaging the clutch-mechanism, substantially as described.

6. A clutch-mechanism for reversing-gearing and the like consisting of a toothed clutch-member connected with one of the shafts, a coöperating toothed clutch-member made as a carrier, and having an end wall, a set of friction disks arranged in said carrier, some slidably connected with the carrier and others slidably connected with the other shaft, a plate arranged in said carrier between the disks and the end-wall thereof, said plate having pins projecting through holes in said end-wall, and springs arranged on said pins, and means to move said plate axially to first move the carrier and disks borne by it as a unit and then to move the disks independently of the carrier for engaging the clutch-mechanism, substantially as described.

7. A clutch-mechanism for reversing-gearing and the like consisting of a toothed clutch-member connected with one of the shafts, a coöperating toothed clutch-member made as a carrier, a set of annular friction-disks arranged in said carrier, some slidably connected with the carrier and others slidably connected with the other shaft, a member arranged in front of said disks, means movably connecting said member with the carrier and means to move said member axially first to move the carrier and disks borne by it as a unit and then to move the disks independently of the carrier for engaging the clutch-mechanism, said moving-means operating on its return to move said member axially in the opposite direction, independent of the carrier, and then to move the carrier and disks borne by it as a unit for disengaging the clutch-mechanism, substantially as described.

8. A clutch-mechanism for reversing-gearing and the like consisting of a toothed clutch-member connected with one of the shafts, an axially movable disk-carrier supported by said clutch-member having a cylindrical side-wall and end-walls, one of said end-walls having teeth for engagement with the toothed clutch-member, a set of annular friction-disks arranged in said carrier, some slidably connected with the carrier and others slidably connected with the other shaft, a plate arranged in said carrier between the set of disks and the adjacent end-wall having a limited sliding movement with respect to the carrier, and means to move said plate axially first to move the carrier and disks borne by it as a unit and then to move said disks independently of the carrier for engaging the clutch-mechanism, said moving-means, upon its return, operating to move said plate axially in the opposite direction first to relieve the pressure upon the disks and then move the carrier and disks borne by it as a unit, substantially as described.

9. A clutch-mechanism for reversing-gearing and the like consisting of a toothed clutch-member connected with one of the shafts, a coöperating toothed clutch-member made as a carrier and having an end-wall, a set of friction-disks arranged in said carrier, some slidably connected with the other shaft, a friction-plate arranged in said carrier between said set of disks and the end-wall, springs to hold said plate normally in engagement with said end-wall, means to move said plate, disks and carrier as a unit to cause the toothed clutch-member of the carrier to engage its fellow clutch-member and to move said plate axially against the force of said springs to apply pressure to the friction-disks, said means also acting with the springs to move said plate axially to relieve the pressure upon the friction-disks and thereafter acting to move said plate, disks and carrier as a unit to cause the toothed clutch-member of the carrier to disengage its fellow clutch-member, substantially as described.

10. A clutch-mechanism for reversing-gearing and the like arranged to act progressively, an operating member, a sliding actuating-member for the clutch-mechanism, lever-mechanism connecting said operating member with the clutch actuating-member, said lever-mechanism being movable from normal to abnormal position to move said clutch actuating-member and then movable as a unit to further move said clutch actuating-member thereby to progressively actuate the clutch-mechanism, substantially as described.

11. A clutch-mechanism for reversing-gearing and the like arranged to act progressively, a thrust collar, a sliding actuating-member for the clutch-mechanism, lever-mechanism connecting said thrust-collar with said clutch actuating-member, said lever-mechanism being movable from normal to abnormal position to move said clutch actuating-member and then movable as a unit to further move said clutch actuating-member, thereby to progressively actuate the clutch-mechanism, and movable from abnormal to normal position to return said clutch actuating-member and then movable as a unit to further return said clutch actuating-member thereby progressively restoring the clutch-mechanism, substantially as described.

12. A clutch-mechanism for reversing-gearing and the like arranged to act progressively, an operating member, a sliding clutch actuating-member, levers connecting said operating member with the clutch actuating-member, a thrust-bar arranged to engage said levers, said levers and thrust-bar having two successive movements imparted to them by the operating member to progressively actuate the clutch-mechanism, substantially as described.

13. A clutch-mechanism for reversing-gearing and the like arranged to act progressively, an operating member, a sliding clutch actuating-member, levers connecting said operating member with said clutch actuating-member, a thrust-bar arranged to engage said levers, said levers and thrust-bar being movable from normal to abnormal position and then movable as a unit to progressively actuate the clutch-mechanism, substantially as described.

14. A clutch-mechanism for reversing-gearing and the like arranged to act progressively, an operating member, a sliding clutch actuating-member, levers connecting said operating member with the clutch actuating-member, a thrust-bar arranged to engage said levers, said levers and thrust-bar being movable from normal to abnormal position and then movable as a unit to progressively actuate the clutch-mechanism, and then returnable from abnormal to normal position to progressively restore the clutch-mechanism, substantially as described.

In testimony whereof, I have signed my name to this specification, in the presence of two subscribing witnesses.

HENRY A. TUTTLE.

Witnesses:
B. J. NOYES,
H. B. DAVIS.